(12) United States Patent
Zhao

(10) Patent No.: US 11,106,095 B1
(45) Date of Patent: Aug. 31, 2021

(54) DISPLAY PANEL AND DISPLAY DEVICE

(71) Applicant: SHENZHEN CHINA STAR OPTOELECTRONICS SEMICONDUCTOR DISPLAY TECHNOLOGY CO., LTD., Guangdong (CN)

(72) Inventor: Nian Zhao, Guangdong (CN)

(73) Assignee: SHENZHEN CHINA STAR OPTOELECTRONICS SEMICONDUCTOR DISPLAY TECHNOLOGY CO., LTD., Shenzhen (CN)

(*) Notice: Subject to any disclaimer, the term of this patent is extended or adjusted under 35 U.S.C. 154(b) by 0 days.

(21) Appl. No.: 16/960,595

(22) PCT Filed: Jun. 3, 2020

(86) PCT No.: PCT/CN2020/094184
§ 371 (c)(1),
(2) Date: Jul. 8, 2020

(30) Foreign Application Priority Data

May 18, 2020 (CN) .......................... 202010419300.9

(51) Int. Cl.
G02F 1/1333 (2006.01)
G02F 1/1339 (2006.01)

(52) U.S. Cl.
CPC ................ *G02F 1/13394* (2013.01)

(58) Field of Classification Search
CPC .................................................. G02F 1/13394
See application file for complete search history.

(56) References Cited

U.S. PATENT DOCUMENTS

| | | | |
|---|---|---|---|
| 2007/0002265 A1 | 1/2007 | Kwak et al. | |
| 2007/0170435 A1 | 7/2007 | Yoo et al. | |
| 2011/0180798 A1* | 7/2011 | Shim | G02F 1/13394 257/59 |
| 2019/0339556 A1* | 11/2019 | Yoshida | G09F 9/30 |
| 2020/0251499 A1* | 8/2020 | Wu | G02F 1/133514 |

FOREIGN PATENT DOCUMENTS

| | | |
|---|---|---|
| CN | 1619391 A | 5/2005 |
| CN | 1892382 A | 1/2007 |
| CN | 102360137 A | 2/2012 |
| CN | 104375331 A | 2/2015 |
| CN | 106249468 A | 12/2016 |

* cited by examiner

Primary Examiner — Sang V Nguyen

(57) ABSTRACT

A display panel and a display device are provided. The display panel includes a first substrate and a second substrate disposed oppositely, and a liquid crystal layer and a column-spaced layer disposed between the first substrate and the second substrate. The column-spaced layer includes at least one main spacer column. The first substrate includes at least one boss region and a main spacer region, a thickness of the first substrate in the main spacer region is less than a thickness of the first substrate in the boss region, and the main spacer column is disposed in the main spacer region.

16 Claims, 3 Drawing Sheets

DISPLAY PANEL AND DISPLAY DEVICE

FIELD OF INVENTION

The present invention relates to the field of display technologies, and in particular, to a display panel and a display device.

BACKGROUND OF INVENTION

Liquid crystal displays (LCDs) are widely used flat panel displays that mainly achieve a screen display through a liquid crystal switch modulating a luminous intensity of a backlight.

Technical Problem

In a display panel with high refresh rate and high resolution, such as frequencies of 120 Hz and 8K pixels, as the resolution and pixels per inch of the display panel increase, a pixel size further decreases, which will increase impedance of circuitry in the display panel. At present, generally, the impedance is reduced by increasing a thickness of each metal layer in an array substrate, but such structure leads to an increase in the thickness and area of a boss portion configured to support a photo spacer (PS) or column spacer in the array substrate. Specifically, the boss portion corresponds to a position where the increased thickness of a gate metal and a source-drain metal are stacked. In addition, it also reduces leveling during a manufacturing process of film layers above the boss portion, resulting in an accumulation of various film layers including the PS, so that a thickness of each film layer at the boss portion is further increased. Finally, a distance between a color filter substrate and the array substrate in the display panel is increased, so that the display panel generates light leakage at a position corresponding to the boss portion.

SUMMARY OF INVENTION

Technical Solution

The present application provides a display panel and a display device to solve the technical problem that a thickness of each metal layer in the display panel increases, so that a thickness of a boss portion supporting a columnar spacer is increased, resulting in light leakage at a position corresponding to the boss portion of the display panel.

To solve the above problem, the technical solutions provided by the present application are as follows.

The present application provides a display panel, including a first substrate, a second substrate arranged opposite to the first substrate, and a liquid crystal layer and a column-spaced layer disposed between the first substrate and the second substrate, wherein the first substrate includes a base and an array structure layer disposed on the base; and wherein the column-spaced layer includes at least one main spacer column, the first substrate includes at least one boss region and a main spacer region, a thickness of the first substrate in the main spacer region is less than a thickness of the first substrate in the boss region, the at least one main spacer column is disposed on the first substrate and is positioned in the main spacer region.

In the display panel of the present application, a thickness of the array structure layer in the main spacer region is less than a thickness of the array structure layer in the boss region.

In the display panel of the present application, the array structure layer includes a first metal layer disposed on the base, a first insulating layer disposed on the first metal layer, and a second metal layer disposed on the first insulating layer, wherein a portion of the first metal layer, the first insulating layer, and the second metal layer are stacked in the boss region, and a portion of the first insulating layer is disposed in the main spacer region.

In the display panel of the present application, the portion of the first metal layer or a portion of the second metal layer is further disposed in the main spacer region.

In the display panel of the present application, the portion of the first metal layer and a portion of the second metal layer are further disposed in the main spacer region;

wherein a thickness of the portion of the first metal layer positioned in the main spacer region is less than a thickness of the portion of the first metal layer positioned in the boss region; and/or a thickness of the portion of the second metal layer positioned in the main spacer region is less than a thickness of the portion of the second metal layer positioned in the boss region.

In the display panel of the present application, the first metal layer includes a gate electrode positioned in the boss region and a plurality of first metal traces positioned in the main spacer region, and the second metal layer includes a source-drain electrode positioned in the boss region and a plurality of second metal traces positioned in the main spacer region.

In the display panel of the present application, in a direction perpendicular to the base, an orthographic projection area of the portion of the first metal layer on the base in the main spacer region is less than an orthographic projection area of the portion of the first metal layer on the base in the boss region.

In the display panel of the present application, the first substrate further includes a color resist layer disposed on the array structure layer and a second insulating layer disposed on the color resist layer;

wherein a thickness of the color resist layer in the boss region is greater than a thickness of the color resist layer in the main spacer region; and a thickness of the second insulating layer in the boss region is greater than a thickness of the second insulating layer in the main spacer region.

In the display panel of the present application, the column-spaced layer includes at least one subsidiary spacer column, and the at least one subsidiary spacer column is disposed on the first substrate and positioned in the boss region.

The present application further provides a display device, the display device including a backlight module and the display panel as described in the previous embodiments arranged on the backlight module arranged on the backlight module.

In the display device of the present application, a thickness of the array structure layer in the main spacer region is less than a thickness of the array structure layer in the boss region.

In the display device of the present application, the array structure layer includes a first metal layer disposed on the base, a first insulating layer disposed on the first metal layer, and a second metal layer disposed on the first insulating layer, wherein a portion of the first metal layer, the first insulating layer, and the second metal layer are stacked in the boss region, and a portion of the first insulating layer is disposed in the main spacer region.

In the display device of the present application, the portion of the first metal layer or a portion of the second metal layer is further disposed in the main spacer region.

In the display device of the present application, the portion of the first metal layer and a portion of the second metal layer are further disposed in the main spacer region;

wherein a thickness of the portion of the first metal layer positioned in the main spacer region is less than a thickness of the portion of the first metal layer positioned in the boss region; and/or a thickness of the portion of the second metal layer positioned in the main spacer region is less than a thickness of the portion of the second metal layer positioned in the boss region.

In the display device of the present application, the first metal layer includes a gate electrode positioned in the boss region and a plurality of first metal traces positioned in the main spacer region, and the second metal layer includes a source-drain electrode positioned in the boss region and a plurality of second metal traces positioned in the main spacer region.

In the display device of the present application, in a direction perpendicular to the base, an orthographic projection area of the portion of the first metal layer on the base in the main spacer region is less than an orthographic projection area of the portion of the first metal layer on the substrate in the boss region.

In the display device of the present application, the first substrate further includes a color resist layer disposed on the array structure layer and a second insulating layer disposed on the color resist layer;

wherein a thickness of the color resist layer in the boss region is greater than a thickness of the color resist layer in the main spacer region; and/or a thickness of the second insulating layer in the boss region is greater than a thickness of the second insulating layer in the main spacer region.

In the display device of the present application, the column-spaced layer includes at least one subsidiary spacer column, and the at least one subsidiary spacer column is disposed on the first substrate and positioned in the boss region.

Beneficial Effect

The beneficial effects of the present application are as follows. In the present application, the thickness of the first substrate in the main spacer region is set to be less than the thickness of the first substrate in the boss region, and the main spacer column is disposed on the first substrate and is positioned in the main spacer region to reduce a cell thickness of the display panel in the boss region, preventing the phenomenon of light leakage caused by the cell thickness of the display panel in the boss region being too thick.

BRIEF DESCRIPTION OF FIGURES

In order to illustrate the technical solutions of the present disclosure or the related art in a clearer manner, the drawings desired for the present disclosure or the related art will be described hereinafter briefly. Obviously, the following drawings merely relate to some embodiments of the present disclosure, and based on these drawings, a person skilled in the art may obtain the other drawings without any creative effort.

DETAILED DESCRIPTION OF EMBODIMENTS

Figure 1:
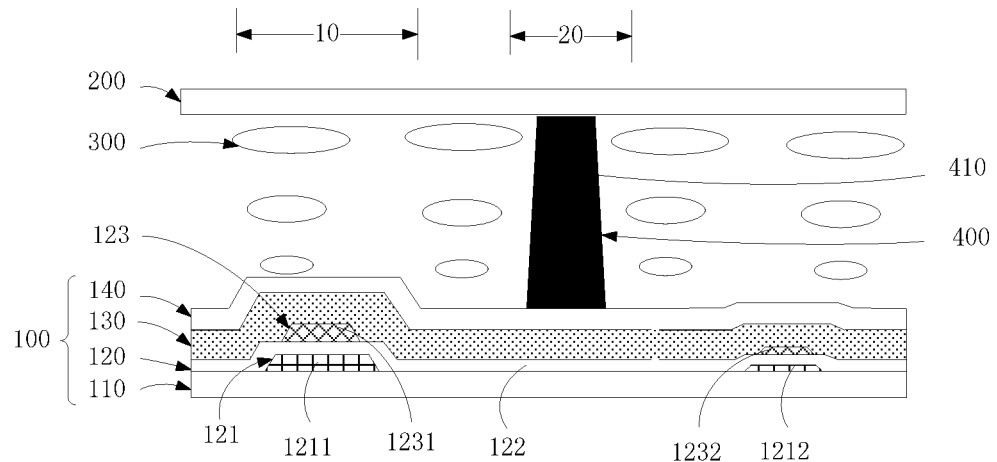
FIG. 1 is a schematic diagram of a first structure of a display panel according to an embodiment of the present application.

The following description of each embodiment, with reference to the accompanying drawings, is used to exemplify specific embodiments which may be carried out in the present invention. Directional terms mentioned in the present invention, such as "top", "bottom", "front", "back", "left", "right", "inside", "outside", "side", etc., are only used with reference to the orientation of the accompanying drawings. Therefore, the used directional terms are intended to illustrate, but not to limit, the present invention. In the drawings, components having similar structures are denoted by the same numerals.

In the description of the present invention, it is to be understood that the terms such as "center", "longitudinal", "transverse", "length", "width", "thickness", "upper", "lower", "front", "rear", "left", "right", "vertical", "horizontal", "top", "bottom", "inside", "outside", "clockwise", "counterclockwise", etc., the orientation or positional relationship of the indications is based on the orientation or positional relationship shown in the drawings, and is merely for the convenience of the description of the invention and the simplified description, rather than indicating or implying that the device or component referred to has a specific orientation, in a specific orientation. The construction and operation are therefore not to be construed as limiting the invention. In addition, unless otherwise defined, any technical or scientific term used herein shall have the common meaning understood by a person of ordinary skills. Such words as "first" and "second" used in the specification and claims are merely used to differentiate different components rather than to represent any order, number or importance. In the description of the present invention, the meaning of "plurality" is two or more unless specifically defined otherwise.

In the description of this application, it should be noted that the terms "installation", "connected", and "coupled" should be understood in a broad sense, unless explicitly stated and limited otherwise. For example, they may be fixed connections, removable connected or integrally connected; it can be mechanical, electrical, or can communicate with each other; it can be directly connected, or it can be indirectly connected through an intermediate medium, it can be an internal communication of two elements or an interaction relationship of two elements. For those of ordinary skill in the art, the specific meanings of the above terms in this application can be understood according to specific situations.

In the present invention, the first feature "on" or "under" the second feature can include direct contact of the first and second features, and can also be included that the first and second features are not in direct contact but are contacted by additional features between them, unless otherwise specifically defined and defined. Moreover, the first feature is "above", "on", and "on the top of" of the second feature, including the first feature directly above and diagonally above the second feature, or simply means that the first feature is horizontally higher than the second feature. The first feature is "under", "below", and "beneath" the second feature, including the first feature directly below and diagonally below the second feature, or merely the first feature is horizontally less than the second feature.

The following disclosure provides many different implementations or examples for implementing different structures of the present application. To simplify the disclosure of the present application, the components and settings of specific examples are described below. Of course, they are merely examples and are not intended to limit the application. Furthermore, the present application may repeat reference numbers and/or reference letters in different examples, and such repetition is for the sake of simplicity and clarity, and does not by itself indicate a relationship between the various embodiments and/or settings discussed. In addition, examples of various specific processes and materials are provided in this application, but those of ordinary skill in the art can be aware of the application of other processes and/or the use of other materials.

The technical solution of the present application will now be described in conjunction with specific embodiments.

The present application provides a display panel 1, as shown in FIGS. 1 to 5, which includes a first substrate 100, a second substrate 200 disposed opposite to the first substrate 100, and a liquid crystal layer 300 and a column-spaced layer 400 disposed between the first substrate 100 and the second substrate 200. The first substrate 100 includes a base 110, and an array structure layer 120 disposed on the base 110.

The column-spaced layer 400 includes at least one main spacer column 410. The first substrate 100 includes at least one boss region 10 and a main spacer region 20. A thickness of the first substrate 100 in the main spacer region 20 is less than a thickness of the first substrate 100 in the boss region 10, and the main spacer column 410 is disposed on the first substrate 100 and is positioned in the main spacer region 20.

It can be understood that, in a display panel with a high refresh rate and high resolution, such as a frequency of 120 Hz and 8K pixels, in order to reduce impedance of circuitry in the display panel, generally, the impedance is reduced by increasing a thickness of each metal layer in an array substrate, but such structure leads to an increase in a thickness and an area of a boss portion configured to support a photo spacer (PS) or column spacer in the array substrate. Specifically, the boss portion corresponds to the position where the increased thickness of a gate metal and a source-drain metal are stacked. In addition, it also reduces leveling during a manufacturing process of film layers above the boss portion, resulting in an accumulation of various film layers including the PS, so that a thickness of each film layer at the boss portion is further increased. Finally, a distance between a color filter substrate and the array substrate in the display panel is increased, so that the display panel generates light leakage at a position corresponding to the boss portion. In the present application, the thickness of the first substrate 100 in the main spacer region 20 is set to be less than the thickness of the first substrate 100 in the boss region 10, and the main spacer column 410 is disposed on the first substrate 100 and is positioned in the main spacer region 20 to reduce a cell thickness of the display panel 1 in the boss region 10, preventing the phenomenon of light leakage caused by the cell thickness of the display panel in the boss region 10 being too thick.

Continuing on, in the present embodiment, under a condition that the thickness of the first substrate 100 in the main spacer region 20 is less than the thickness of the first substrate 100 in the boss region 10, a position of the main spacer region 20 can be selected according to actual situations. The main spacer column 410 is disposed on the first substrate 100 and is positioned in the main spacer region 20 to avoid disposing the main spacer column 410 at the thicker boss region 10 of the first substrate 100, preventing the light leakage caused by the cell thickness of the display panel in the boss region 10 being too thick.

Figure 2:
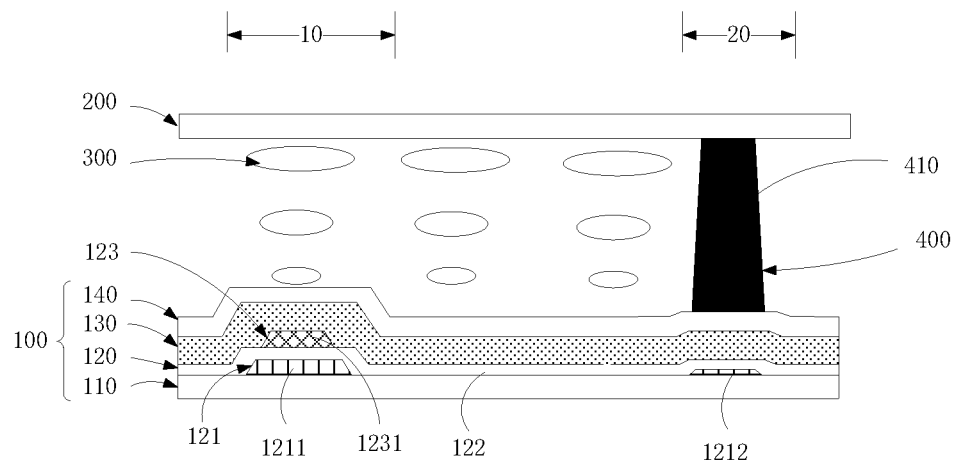
FIG. 2 is a schematic diagram of a second structure of the display panel according to an embodiment of the present application.
Figure 3:
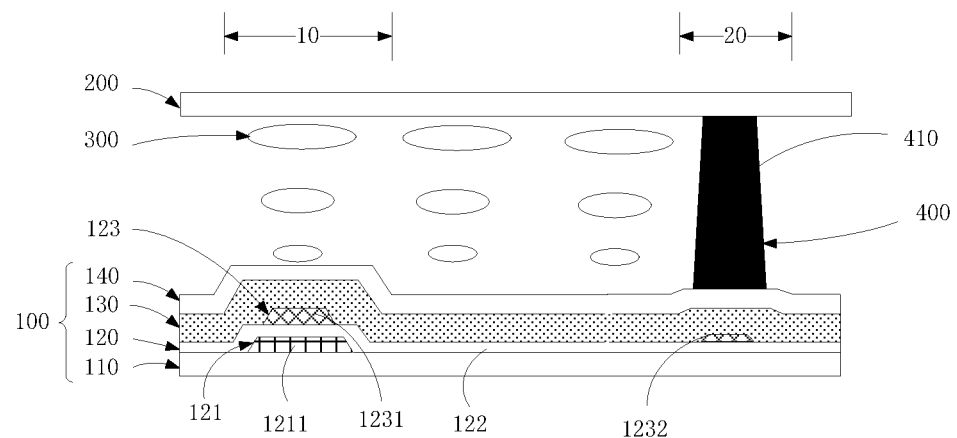
FIG. 3 is a schematic diagram of a third structure of the display panel according to an embodiment of the present application.

In an embodiment, as shown in FIGS. 1 to 3, a thickness of the array structure layer 120 in the main spacer region 20 is less than a thickness of the array structure layer 120 in the boss region 10. Obviously, the main spacer column 410 is disposed in the main spacer region 20, and the thickness of the array structure layer 120 in the main spacer region 20 is set to be less than the thickness of the array structure layer 120 in the boss region 10, so that the thickness of the first substrate 100 in the main spacer region 20 is less than the thickness of the first substrate 100 in the boss region 10, preventing the first substrate 100 from being too high in a place where the main spacer column 410 is provided, thereby preventing the light leakage caused by the cell thickness of the display panel 1 in the place where the main spacer column 410 is provided being too thick.

In an embodiment, as shown in FIG. 1, the array structure layer 120 includes a first metal layer 121 disposed on the base 110, a first insulating layer 122 disposed on the first metal layer 121, and a second metal layer 123 disposed on the first insulating layer 122. A portion of the first metal layer 121, the first insulating layer 122, and the second metal layer 123 are stacked in the boss region 10, and a portion of the first insulating layer 122 is disposed in the main spacer region 20. It can be understood that since only a portion of the first insulating layer 122 is provided in the main spacer region 20, and the first metal layer 121 and the second metal layer 123 are not provided, and portion of the first metal layer 121, the first insulating layer 122, and the second metal layer 123 are provided in the boss region 10, making the main spacer region 20 lack of a portion of a functional layer. Therefore, the thickness of the array structure layer 120 in the main spacer region 20 is less than the thickness of the array structure layer 120 in the boss region 10.

In an embodiment, as shown in FIGS. 2 to 3, the main spacer region 20 is further provided with a portion of the first metal layer 121 or a portion of the second metal layer 123. It can be understood that, in addition to the portion of the first insulating layer 122 disposed in the main spacer region 20, a portion of the first metal layer 121 or a portion of the second metal layer 123 can be disposed in the main spacer region 20. Since the portion of the first metal layer 121, the first insulating layer 122, and the second metal layer 123 are provided in the boss region 10, the main spacer region 20 lack of the thickness of the first metal layer or the thickness of the second metal layer 123. Therefore, the thickness of the array structure layer 120 in the main spacer region 20 is less than the thickness of the array structure layer 120 in the boss region 10.

Figure 4:
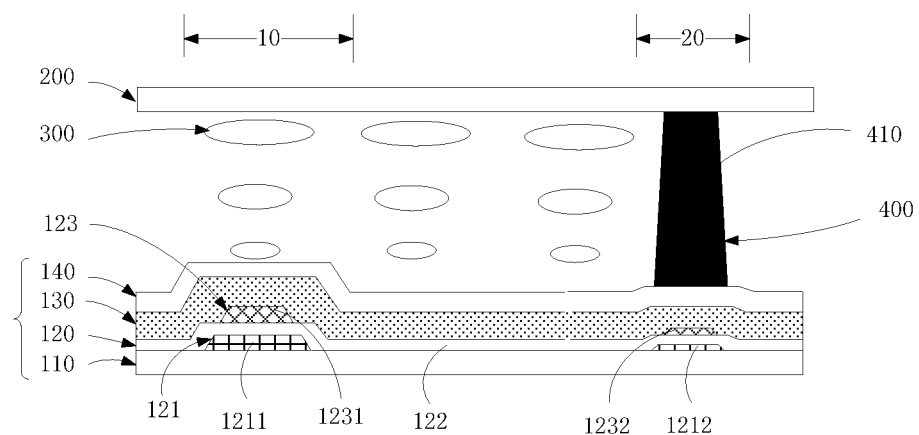
FIG. 4 is a schematic diagram of a fourth structure of the display panel according to an embodiment of the present application.

In an embodiment, as shown in FIG. 4, a portion of the first metal layer 121 and a portion of the second metal layer 123 are further disposed in the main spacer region 20.

Wherein, a thickness of the portion of the first metal layer 121 positioned in the main spacer region 20 is less than a thickness of the portion of the first metal layer 121 positioned in the boss region 10; and/or a thickness of the portion of the second metal layer 123 positioned in the main spacer region 20 is less than a thickness of the portion of the second metal layer 123 positioned in the boss region 10.

It can be understood that in the present embodiment, the portion of the first metal layer 121, the first insulating layer 122, and the second metal layer 123 are disposed in both the main spacer region 20 and the boss region 10, but the thickness of the portion of the first metal layer 121 positioned in the main spacer region 20 is set to be less than the thickness of the portion of the first metal layer 121 positioned in the boss region 10; the thickness of the portion of the second metal layer 123 positioned in the main spacer region 20 is less than the thickness of the portion of the second metal layer 123 positioned in the boss region 10. Therefore, the thickness of the array structure layer 120 in the main spacer region 20 is less than the thickness of the array structure layer 120 in the boss region 10 to reduce the thickness of the display panel 1 corresponding to a position of the main spacer column 410, preventing light leakage caused by the display panel 1 being too thick. It is worth noting that the portion of the first metal layer 121 positioned in the boss region 10 can be a thin film transistor with greater thickness, and the portion of the first metal layer 121 positioned in the main spacer region 20 can be a thin film transistor with lesser thickness. Thereby, the thickness of the portion of the first metal layer 121 positioned in the main spacer region 20 is less than the thickness of the portion of the first metal layer 121 positioned in the boss region 10. In addition, the thickness of the second metal layer 123 positioned in the main spacer region 20 is less than the thickness of the second metal layer 123 positioned in the boss region 10; of course, it also includes other structures for realizing the above-mentioned structural relationship, which will not be repeated here.

As mentioned above, in the present embodiment, as shown in FIG. 4, the first metal layer 121 includes a gate electrode 1211 positioned in the boss region 10 and a plurality of first metal traces 1212 positioned in the main spacer region 20, the second metal layer 123 includes a source-drain electrode 1231 positioned in the boss region 10, and a plurality of second metal traces 1232 positioned in the main spacer region 20. Obviously, a thickness of the gate electrode 1211 is greater than a thickness of the first metal traces 1212, and a thickness of the source-drain electrode 1231 is greater than a thickness of the second metal traces 1232. Specifically, the first metal traces 1212 can be a circuit structure such as a scan line positioned in the first metal layer 121; the second metal traces 1232 can be the circuit structure such as a data line positioned in the second metal layer 123.

In an embodiment, as shown in FIGS. 2 to 5, in a direction perpendicular to the base 110, an orthographic projection area of the portion of the first metal layer 121 on the base 110 in the main spacer region 20 is less than an orthographic projection area of the portion of the first metal layer 121 on the base in the boss region 10. It can be understood that the orthographic projection area of the portion of the first metal layer 121 on the base 110 in the main spacer region 20 is set to be less than the orthographic projection area of the portion of the first metal layer 121 on the base in the boss region 10. Thereby, an area of the array structure layer 120 in the main spacer region 20 is relatively small. When forming a color resist layer 130, a second insulating layer 140, and the main spacer column 410 on the array structure layer 120, increasing the leveling of each film layer above the main spacer region 20 prevents the accumulation of the film layers in the main spacer region 20, thereby preventing a cell thickness of the display panel 1 in the main spacer region 20 from being too thick, and solving the problem of light leakage of the display panel 1.

Figure 5:
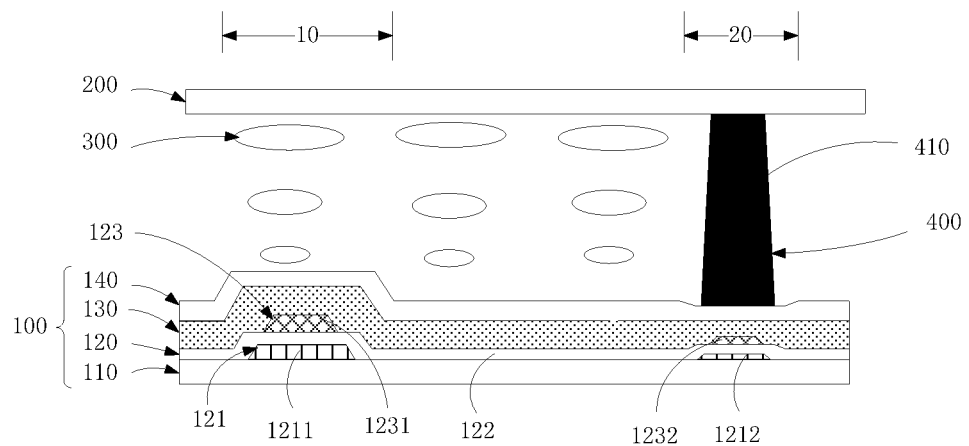
FIG. 5 is a schematic diagram of a fifth structure of the display panel according to an embodiment of the present application.

In an embodiment, as shown in FIG. 5, the first substrate 100 further includes the color resist layer 130 disposed on the array structure layer 120 and the second insulating layer 140 disposed on the color resist layer 130.

Wherein, a thickness of the color resist layer 130 in the boss region 10 is greater than the thickness of the color resist layer 130 in the main spacer region 20; and/or a thickness of the second insulating layer 140 in the boss region 10 is greater than the thickness of the second insulating layer 140 in the main spacer region 20.

It can be understood that the first substrate 100 is a color filter on array (COA) structure, the color resist layer 130 is disposed on the array structure layer 120, the first substrate 100 can be a polymer film on array (PFA), and the second insulating layer 140 can be an organic insulating layer. By setting the thickness of the color resist layer 130 in the boss region 10 to be greater than the thickness of the color resist layer 130 in the main spacer region 20; and/or setting the thickness of the second insulating layer 140 in the boss region 10 to be greater than the thickness of the second insulating layer 140 in the main spacer region 20, the thickness of the first substrate 100 in the main spacer region 20 is less than the thickness of the first substrate 100 in the boss region 10. Specifically, it can also be manufactured by a process using a gray scale photomask to thin the thickness of the color resist layer 130 in the main spacer region 20. Similarly, the thickness of the second insulating layer 140 in the main spacer region 20 can also be reduced by the manufacturing process of the gray scale photomask.

Figure 6:
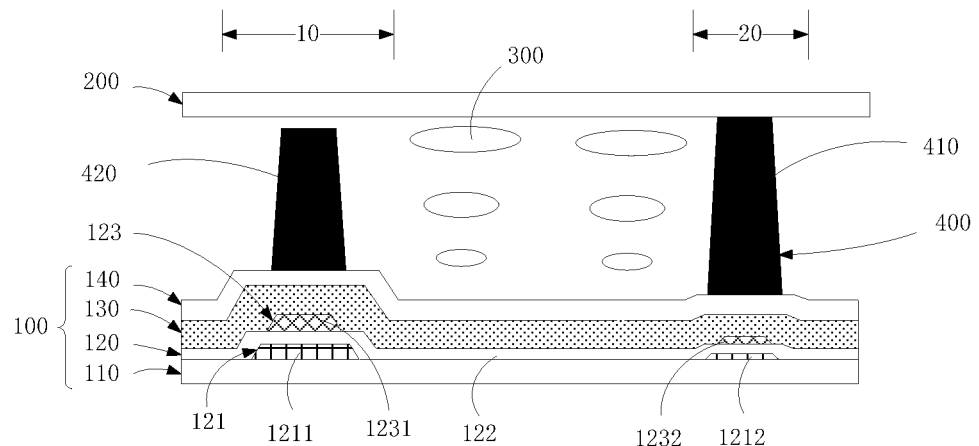
FIG. 6 is a schematic diagram of a sixth structure of the display panel according to an embodiment of the present application.

In an embodiment, as shown in FIG. 6, the column-spaced layer 400 includes at least one subsidiary spacer column 420 disposed on the first substrate 100, and the subsidiary spacer column 420 is positioned in the boss region 10. Obviously, the placement of the main spacer column 410 in the boss region 10 will cause the cell thickness of the display panel 1 to be too thick in the boss region 10, resulting in light leakage of the display panel 1. In the present embodiment, on the basis that the main spacer column 410 is disposed on the first substrate 100 and is positioned in the main spacer region 20, the subsidiary spacer column 420 can be disposed on the first substrate 100 and positioned in the boss region 10 to reduce the cell thickness of the display panel 1 in the boss region 10. In the meantime, when the main spacer column 410 does not support the display panel 1 sufficiently, the subsidiary spacer column 420 can be used to support the display panel 1 in the boss region 10. Specifically, the subsidiary spacer column 420 can be formed by the manufacturing of the gray scale photomask, and will not be repeated here.

Figure 7:
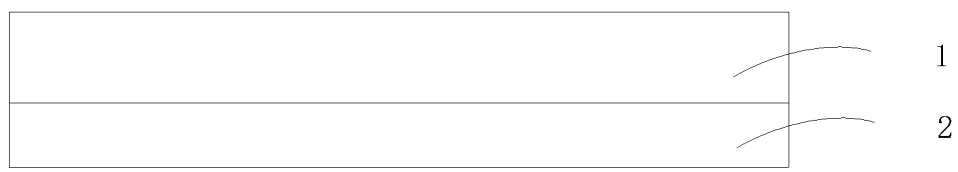
FIG. 7 is a schematic structural diagram of a display device of the present application.

The present application further provides a display device. As shown in FIG. 7, the display device includes a backlight module 2 and the display panel 1 as described in the previous embodiments arranged on the backlight module 2.

The operation principle of the display device is same as or similar to that of the display panel 1 described above, and will not be repeated here.

In summary, the display panel 1 in the present application includes a first substrate 100, a second substrate 200 disposed opposite to the first substrate 100, and a liquid crystal layer 300 and a column-spaced layer 400 positioned between the first substrate 100 and the second substrate 200. The first substrate 100 includes a base 110, and an array structure layer 120 disposed on the base 110. The column-spaced layer 400 includes at least one main spacer column 410. The first substrate 100 includes at least one boss region 10 and a main spacer region 20. A thickness of the first substrate 100 in the main spacer region 20 is less than a thickness of the first substrate 100 in the boss region 10, and the main spacer column 410 is disposed on the first substrate 100 and is positioned in the main spacer region 20. Through setting the thickness of the first substrate 100 in the main spacer region 20 to be less than the thickness of the first substrate 100 in the boss region 10, and disposing the main spacer column 410 on the first substrate 100 and in the main spacer region 20, a cell thickness of the display panel 1 in the boss region 10 is reduced, preventing the phenomenon of light leakage caused by the cell thickness of the display panel in the boss region 10 being too thick.

Embodiments of the present invention have been described, but not intended to impose any unduly constraint to the appended claims. For a person skilled in the art, any modification of equivalent structure or equivalent process made according to the disclosure and drawings of the present invention, or any application thereof, directly or indirectly, to other related fields of technique, is considered encompassed in the scope of protection defined by the claims of the present invention.

What is claimed is:

1. A display panel, comprising a first substrate, a second substrate arranged opposite to the first substrate, and a liquid crystal layer and a column-spaced layer disposed between the first substrate and the second substrate, wherein the first substrate comprises a base and an array structure layer disposed on the base; and
    wherein the column-spaced layer comprises at least one main spacer column, the first substrate comprises at least one boss region and a main spacer region, a thickness of the first substrate in the main spacer region is less than a thickness of the first substrate in the boss region, and the at least one main spacer column is disposed on the first substrate and is positioned in the main spacer region;
    wherein the first substrate further comprises a color resist layer disposed on the array structure layer and a second insulating layer disposed on the color resist layer;
    wherein a thickness of the color resist layer in the boss region is greater than a thickness of the color resist layer in the main spacer region, and a thickness of the second insulating layer in the boss region is greater than a thickness of the second insulating layer in the main spacer region; and
    wherein the at least one main spacer column is positioned in a groove of the second insulating layer where the thickness of the second insulating layer in the main spacer region is less than the thickness of the second insulating layer in the boss region.

2. The display panel of claim 1, wherein a thickness of the array structure layer in the main spacer region is less than a thickness of the array structure layer in the boss region.

3. The display panel of claim 2, wherein the array structure layer comprises a first metal layer disposed on the base, a first insulating layer disposed on the first metal layer, and a second metal layer disposed on the first insulating layer, wherein a portion of the first metal layer, the first insulating layer, and the second metal layer are stacked in the boss region, and a portion of the first insulating layer is disposed in the main spacer region.

4. The display panel of claim 3, wherein the portion of the first metal layer or a portion of the second metal layer is further disposed in the main spacer region.

5. The display panel of claim 3, wherein the portion of the first metal layer and a portion of the second metal layer are further disposed in the main spacer region;
    wherein a thickness of the portion of the first metal layer positioned in the main spacer region is less than a thickness of the portion of the first metal layer positioned in the boss region; and/or
    a thickness of the portion of the second metal layer positioned in the main spacer region is less than a thickness of the portion of the second metal layer positioned in the boss region.

6. The display panel of claim 5, wherein the first metal layer comprises a gate electrode positioned in the boss region and a plurality of first metal traces positioned in the main spacer region, and the second metal layer comprises a source-drain electrode positioned in the boss region and a plurality of second metal traces positioned in the main spacer region.

7. The display panel of claim 5, wherein, in a direction perpendicular to the base, an orthographic projection area of the portion of the first metal layer on the base in the main spacer region is less than an orthographic projection area of the portion of the first metal layer on the base in the boss region.

8. The display panel of claim 1, wherein the column-spaced layer comprises at least one subsidiary spacer column, and the at least one subsidiary spacer column is disposed on the first substrate and positioned in the boss region.

9. A display device, comprising a backlight module and the display panel of claim 1 arranged on the backlight module;
    wherein the first substrate further comprises a color resist layer disposed on the array structure layer and a second insulating layer disposed on the color resist layer;
    wherein a thickness of the color resist layer in the boss region is greater than a thickness of the color resist layer in the main spacer region, and a thickness of the second insulating layer in the boss region is greater than a thickness of the second insulating layer in the main spacer region; and
    wherein the at least one main spacer column is positioned in a groove of the second insulating layer where the thickness of the second insulating layer in the main spacer region is less than the thickness of the second insulating layer in the boss region.

10. The display device of claim 9, wherein a thickness of the array structure layer in the main spacer region is less than a thickness of the array structure layer in the boss region.

11. The display device of claim 10, wherein the array structure layer comprises a first metal layer disposed on the base, a first insulating layer disposed on the first metal layer, and a second metal layer disposed on the first insulating layer, wherein a portion of the first metal layer, the first insulating layer, and the second metal layer are stacked in the boss region, and a portion of the first insulating layer is disposed in the main spacer region.

12. The display device of claim 11, wherein the portion of the first metal layer or a portion of the second metal layer is further disposed in the main spacer region.

13. The display device of claim 11, wherein the portion of the first metal layer and a portion of the second metal layer are further disposed in the main spacer region;
wherein a thickness of the portion of the first metal layer positioned in the main spacer region is less than a thickness of the portion of the first metal layer positioned in the boss region; and/or
a thickness of the portion of the second metal layer positioned in the main spacer region is less than a thickness of the portion of the second metal layer positioned in the boss region.

14. The display device of claim 13, wherein the first metal layer comprises a gate electrode positioned in the boss region and a plurality of first metal traces positioned in the main spacer region, and the second metal layer comprises a source-drain electrode positioned in the boss region and a plurality of second metal traces positioned in the main spacer region.

15. The display device of claim 13, wherein, in a direction perpendicular to the base, an orthographic projection area of the portion of the first metal layer on the base in the main spacer region is less than an orthographic projection area of the portion of the first metal layer on the substrate in the boss region.

16. The display device of claim 9, wherein the column-spaced layer comprises at least one subsidiary spacer column, and the at least one subsidiary spacer column is disposed on the first substrate and positioned in the boss region.

* * * * *